United States Patent [19]

Oiyama et al.

[11] Patent Number: 4,734,330

[45] Date of Patent: Mar. 29, 1988

[54] MAGNETIC RECORDING MEDIUM

[75] Inventors: Kiyokazu Oiyama; Yoshinobu Ninomiya, both of Miyagi; Hiroshi Yoshioka; Ichiro Ono, both of Gunma, all of Japan

[73] Assignees: Sony Corporation; Shin-Etsu Chemical Co. Ltd., both of Tokyo, Japan

[21] Appl. No.: 881,285

[22] Filed: Jul. 2, 1986

[30] Foreign Application Priority Data

Jul. 2, 1985 [JP] Japan .................. 60-145362

[51] Int. Cl.$^4$ .............................. G11B 5/702
[52] U.S. Cl. .................. 428/411.1; 427/128; 428/522; 428/694; 428/695; 428/900
[58] Field of Search ............ 428/694, 329, 328, , 428/695, 900, 411.1, 522; 427/131, 132, 128; 360/134–136

[56] References Cited

U.S. PATENT DOCUMENTS

| | | | |
|---|---|---|---|
| 4,152,485 | 5/1979 | Mizumura | 428/900 |
| 4,407,901 | 10/1983 | Miyatsuka | 428/900 |
| 4,423,115 | 12/1983 | Tokuda | 428/522 |
| 4,521,486 | 6/1985 | Ninomiya | 427/128 |
| 4,529,661 | 7/1985 | Ninomiya | 428/900 |
| 4,533,565 | 8/1985 | Okita | 428/900 |
| 4,594,174 | 6/1986 | Nakayama | 428/425.9 |
| 4,600,521 | 7/1986 | Nakamura | 428/694 |
| 4,613,545 | 9/1986 | Chubachi | 428/328 |

FOREIGN PATENT DOCUMENTS

| | | | |
|---|---|---|---|
| 3622070 | 1/1987 | Fed. Rep. of Germany | 428/694 |
| 0175024 | 10/1984 | Japan | 428/694 |
| 008329 | 1/1987 | Japan | 428/694 |
| 006430 | 1/1987 | Japan | 428/694 |
| 028924 | 2/1987 | Japan | 428/694 |

Primary Examiner—Ellis P. Robinson
Attorney, Agent, or Firm—Hill, Van Santen, Steadman & Simpson

[57] ABSTRACT

Described is a magnetic recording medium comprising a non-magnetic substrate and a magnetic layer formed thereon composed mainly of magnetic powder and a binder, said binder containing a compound represented by a following formula:

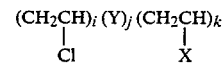

wherein X represents tertiary amine sulfonate or tertiary amine sulfuric ester, Y represents a monomer having vinyl group which is copolymerizable with vinyl chloride and i, j, k represent polymerization degrees.

8 Claims, No Drawings

MAGNETIC RECORDING MEDIUM

BACKGROUND OF THE INVENTION

1. Field of the Invention

This invention relates to a magnetic recording medium, such as magnetic tape. More particularly, it relates to an improvement in a binder contained in the magnetic layer which is formed on the non-magnetic base material of the magnetic recording medium.

2. Description of the Prior Art

Recently, in magnetic recording media such as those for video tape recorders (VTRs), a demand is raised for improving magnetic properties as well as electro-magnetic conversion properties thereof for obtaining a high playback output even on the occasion of the short wavelength recording. As a measure therefor, it has been tried to comminute magnetic powders while increasing the coercive force and so-called packing density of the magnetic powders in the magnetic layer.

On the other hand, binders such as vinyl chloride binders including vinyl chloride-vinyl acetate copolymer, vinyl chloride-propionic acid copolymer or vinyl chloride-vinyl acetate-vinyl alcohol copolymer, have so far been used as the binder for the magnetic recording medium. Above all, the vinyl chloride-vinyl acetate-vinyl alcohol copolymers have been extensively used since the hydroxyl group of the vinyl alcohol monomer contributes to dispersibility of the magnetic powders while the active hydrogen of the hydroxyl group reacts with an isocyanate compound to form a cross-linked structure to enhance the mechanical strength of the coating layer.

However, with the increase in cohesive force due to increased coercive force and the increase in the specific surface area due to communition of the magnetic particles as described above, it is not possible with the aforementioned binder to obtain satisfactory dispersibility or surface properties such that it is becoming difficult to increase the packing density of the magnetic powders. Hence the binder leaves much to be desired in durability, magnetic properties and electro-magnetic conversion properties. Although suitable surfactants may be used as the dispersant, the surfactants are of low molecular weight such that, when they are present in the magnetic layer, problems are presented in durability or mechanical strength such as blooming caused by temporal changes or powder debris.

Hence, a demand is raised for a binder capable of significantly improving the aforementioned properties of the magnetic recording medium. Thus there is proposed a technology in which a polymeric material comprised of vinyl chloride-vinyl acetate copolymer or vinyl chloride-vinyl acetate-vinyl alcohol copolymer into the side chains of which are introduced polar groups such as sulfonic acid or alkali metal salts thereof, acidic sulfuric acid esters or alkali metal salts thereof, or carboxylic acid or metal salts thereof, is used as the binder.

Although the binder according to the above described technology shows some limited effect in improving the dispersibility in comparison with the conventional binder in which polar groups are not introduced, it has only insufficient effect for magnetic powders showing a higher coercive force and ultra-comminuted magnetic powders.

There has not been evolved a binder showing a sufficient dispersibility for these ultra-comminuted magnetic powders and hence it has been difficult to procure predetermined durability, magnetic properties and electromagnetic conversion properties of the magnetic recording medium that make use of these ultra-comminuted magnetic particles.

SUMMARY OF THE INVENTION

It is therefore an object of the present invention to provide a solution to the aforementioned deficiency by improving affinity of the binder to the magnetic powders as well as dispersibility of the magnetic powders showing a higher coercive force and ultra-comminuted magnetic particles.

It is another object of the present invention to provide a magnetic recording medium in which surface characteristics of the magnetic layer are improved through the aforementioned improvement in dispersibility for thereby improving durability as well as magnetic and electro-magnetic conversion characteristics of the magnetic recording medium.

The present invention provides a magnetic recording medium in which a magnetic layer consisting essentially of the ferromagnetic powders and the binder is formed on the non-magnetic base material, wherein the binder contained in the magnetic layer is formed of a vinyl chloride copolymer containing tertiary amine sulfonate or tertiary amine sulfuric ester in the molecule as polar group. In this manner, improvement may be achieved in dispersibility of the magnetic powders as well as surface characteristics of the magnetic layer and in the durability, magnetic characteristics and electro-magneticconversion characteristics of the produced magnetic recording medium.

As described hereinabove, since the vinyl chloride copolymer containing tertiary amine sulfonate or tertiary amine sulfuric ester as polar group in the molecule is used as the binder, there results a significant increase in the affinity to the magnetic powders and in the dispersion of the magnetic powders even if they are ultra-comminuted or show a higher coercive force.

DESCRIPTION OF THE PREFERRED EMBODIMENT

As a result of our prolonged eager researches and investigations towards achieving the aforementioned object, the present inventors have found that the vinyl chloride copolymer containing tertiary amine sulfonate or tertiary amine sulfuric ester in the side chain thereof shows high affinity to the magnetic powders. Based on this finding, the present invention provides a magnetic recording medium in which the magnetic layer consisting essentially of the ferromagnetic powders and the binder is formed on the non-magnetic base material, wherein the improvement resides in that the magnetic layer contains as the binder the vinyl chloride copolymer including tertiary amine sulfonate or tertiary amine sulfuric ester as the polar group in the molecule.

The vinyl chloride copolymer contained in the binder is the vinyl chloride copolymer in the side chains of which tertiary amine sulfonate or tertiary amine sulfuric ester is introduced as polar groups. It is a compound represented by the general formula

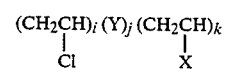

where X represents tertiary amine sulfonate or tertiary amine sulfuric ester as polar groups, Y represents monomers which copolymerizeable with vinyl chloride and i, j and k represent integers. It is noted that, while the respective monomers of the compound are shown in the above formula to be grouped together so as to form a regular sequence of the different monomers, it is also possible that the monomers be arranged in a dispersed pattern in regular sequence or at random.

The polar groups X introduced into the side chain may be enumerated by

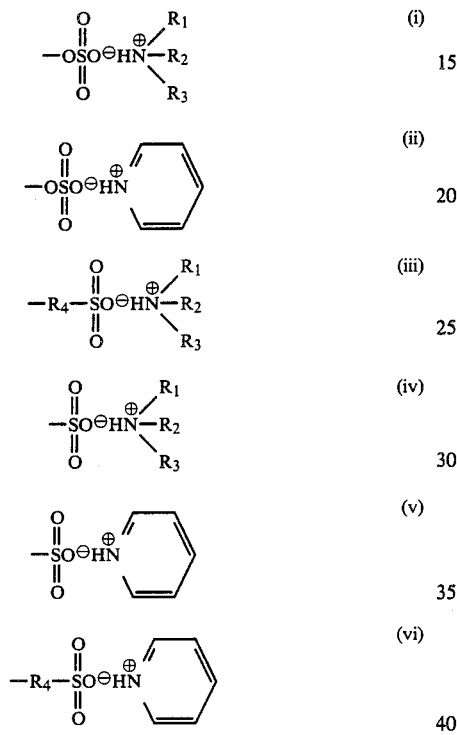

In any of these polar groups, $R_1$, $R_2$ and $R_3$ represent monovalent hydrocarbon groups with 1 to 6 carbon atoms and $R_4$ represents a divalent organic group selected from the group consisting of —$CH_2$—, —$OCH_2CH_2CH_2$—,

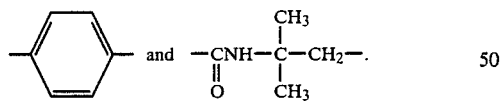

These polar groups may be enumerated by

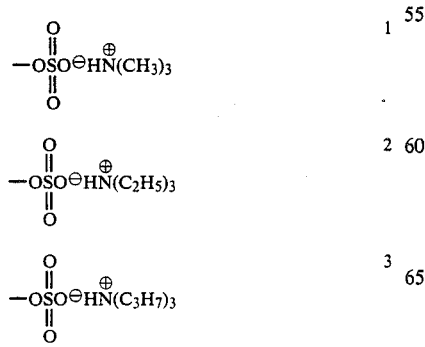

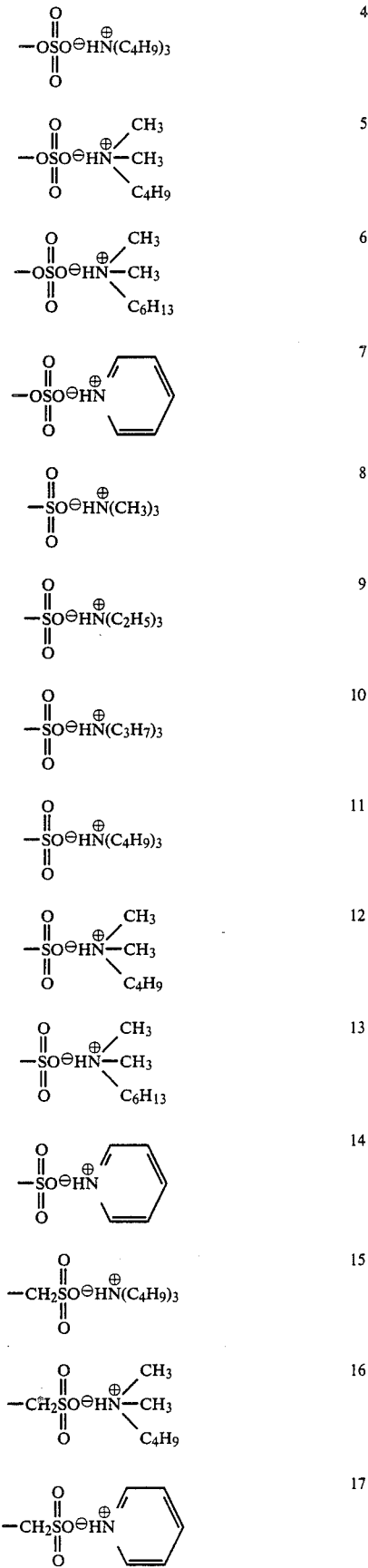

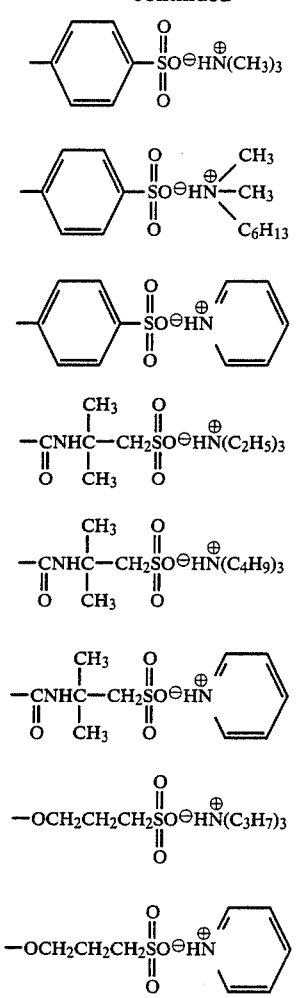

These polar groups may be introduced vinyl chloride copolymer by any of the following methods.

(A) The method of grafting to vinyl chloride-vinyl acetate-polyvinyl alcohol copolymer acidic sulfuric acid esters, sulfonic acid groups or organic groups containing sulfonic acid groups.

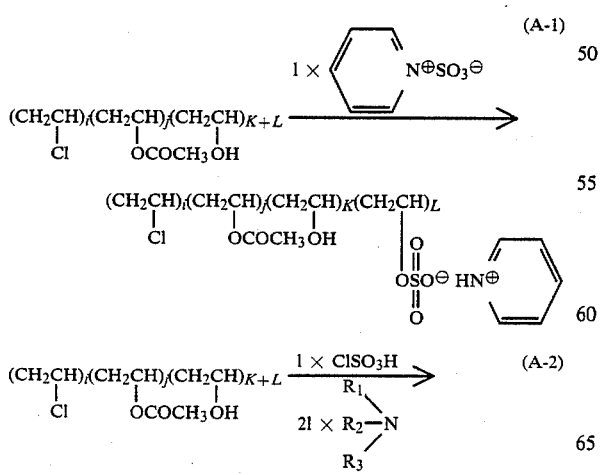
(A-1)

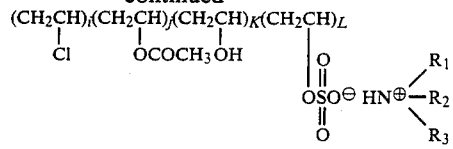
(A-2)

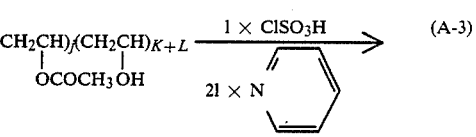

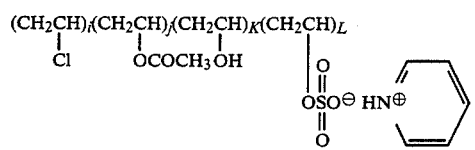

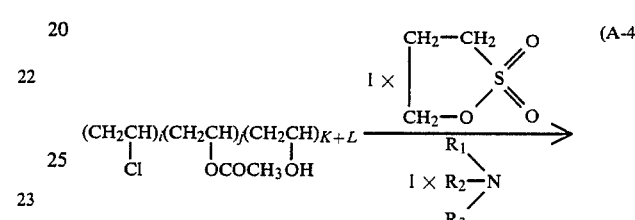
(A-3)

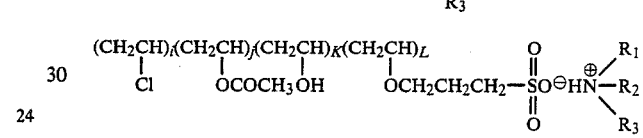

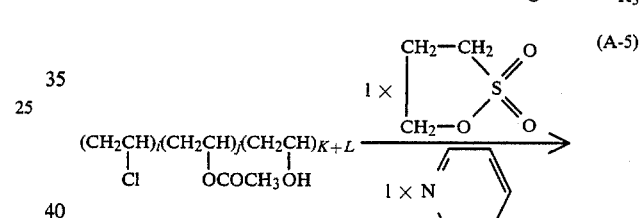
(A-4)

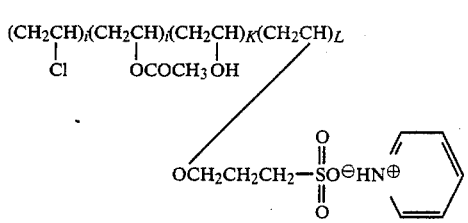

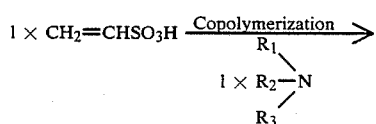
(A-5)

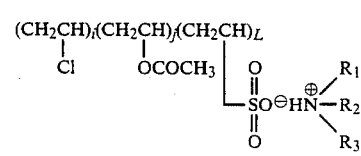

(B) The method of copolymerizing vinyl chloride and vinyl acetate with a vinyl monomer containing sulfonic acid groups or tertiary amine sulfonate in the presence of a radical-liberating agent.

$i \times CH_2=CHCl + j \times CH_3COOCH=CH_2 +$ (B-1)

$i \times CH_2=CHCl + j \times CH_3COOCH=CH_2 +$ (B-2)

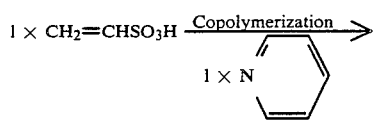

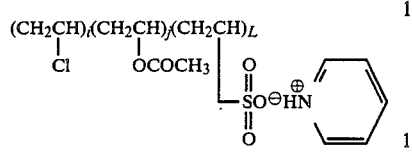

$i \times CH_2=CHCl + j \times CH_3COOCH=CH_2 +$ (B-3)

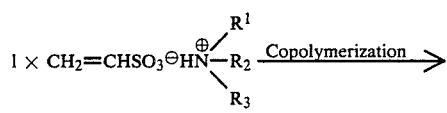

(CH$_2$CH)$_i$(CH$_2$CH)$_j$(CH$_2$CH)$_L$
 |                |
 Cl              OCOCH$_3$  ... SO$^\ominus$HN$^\oplus$—R$_2$ / R$_1$, R$_3$ $i \times CH_2=CHCl + j \times CH_3COOCH=CH_2 +$ (B-4)

$1 \times CH_2=CHSO_3^\ominus HN^\oplus$—⟨phenyl⟩  Copolymerization →

(CH$_2$CH)$_i$(CH$_2$CH)$_j$(CH$_2$CH)$_L$
 |                |
 Cl              OCOCH$_3$  ... SO$^\ominus$HN$^\oplus$—⟨phenyl⟩

$i \times CH_2=CHCl + j \times CH_3COOCH=CH_2 +$ (B-5)

$1 \times R_5SO_3H$  Copolymerization →
$1 \times R_2$—N⟨R$_1$, R$_3$⟩

(CH$_2$CH)$_i$(CH$_2$CH)$_j$(CH$_2$CH)$_L$
 |                |
 Cl              OCOCH$_3$  ... R$_4$—SO$^\ominus$HN$^\oplus$—R$_2$ / R$_1$, R$_3$ $i \times CH_2=CHCl + j \times CH_3COOCH=CH_2 +$ (B-6)

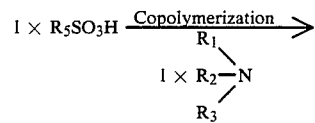

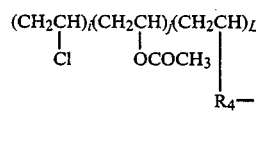

$i \times CH_2=CHCl + j \times CH_3COOCH=CH_2 +$ (B-7)

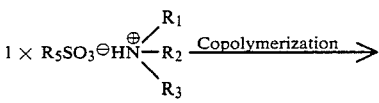

(CH$_2$CH)$_i$(CH$_2$CH)$_j$(CH$_2$CH)$_L$
 |                |
 Cl              OCOCH$_3$  ... R$_4$—SO$^\ominus$HN$^\oplus$—R$_2$ / R$_1$, R$_3$ $i \times CH_2=CHCl + j \times CH_3COOCH=CH_2 +$ (B-8)

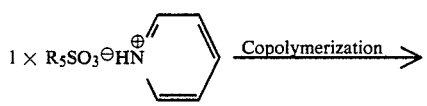

(CH$_2$CH)$_i$(CH$_2$CH)$_j$(CH$_2$CH)$_L$
 |                |
 Cl              OCOCH$_3$  ... R$_4$—SO$^\ominus$HN$^\oplus$—⟨phenyl⟩

(R$_5$ represents $CH_2=CH-CH_2-$,

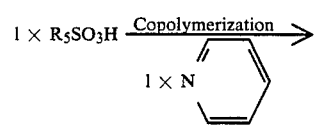

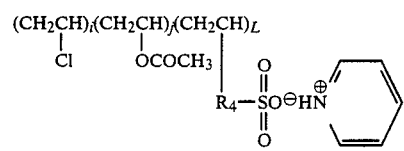

and $CH_2=CHCNH-\underset{CH_3}{\underset{|}{\overset{CH_3}{\overset{|}{C}}}}-CH_2-$.)

In the compound prepared by any of the aforementioned methods, that is, the binder the vinyl chloride monomer contributes to the strength of the coating layer and solubility thereof in the solvent. That is, when the polymerization degree i of the vinyl chloride monomer is lesser than 100, the desired strength of the coating layer is not obtained. With the polymerization degree i larger than 1000, solubility of the coating layer is lowered. It is preferably that the polymerization degree i of the vinyl chloride monomer is in the range of 100 to 1000. In addition, although the vinyl monomer into the side chains of which the polar groups X are introduced contributes to improved dispersibility of the magnetic by the presence of the polar groups in the side chains, the polymerization degree k thereof should be in the range of 0.1 to 100 since, with the polymerization degree k larger than 100, there is little effect derived in increasing the dispersibility but rather the compound may be lowered in moisture proofness. Also, in respect to the solubility in the solvent, progresses in the cross linking property with isocyanate, or in the strength of coating layer, it is possible to copolymerize at least one except for said monomer but from the selection of vinyl acetate, vinyl alcohol, maleic acid, maleic anhydride, acrylic acid, acrylic ester, methacrylic acid, methacrylic ester, acrylonitrile, vinylidene chloride, vinyl propionate, et. al. as monomer Y having a vinyl group or vinyl groups copolymerizable with vinyl chloride.

In light of the above, the following compound may be advantageously employed as the binder in accordance with the present invention.

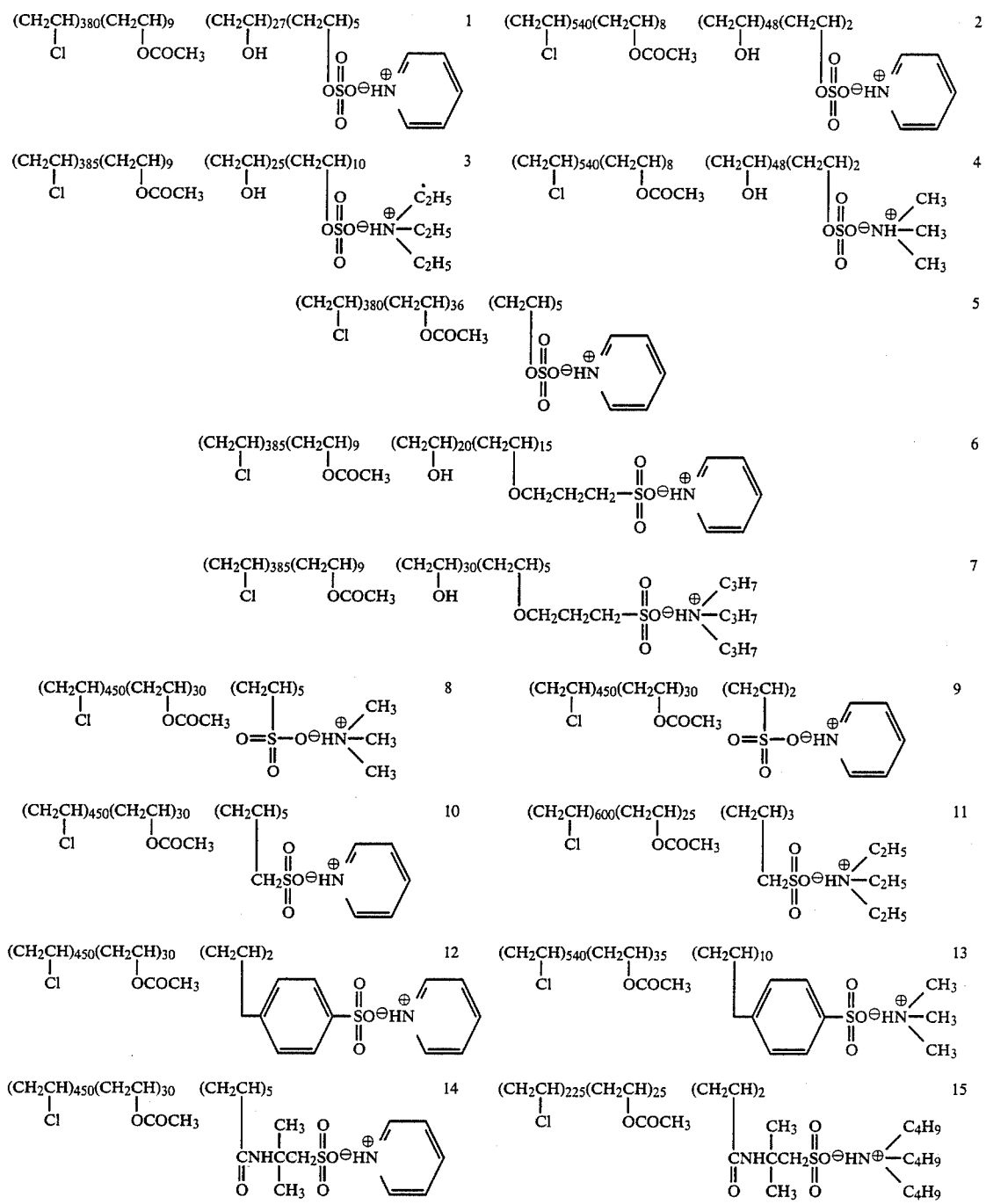

The compounds shown by the above general formula may be used as an admixture with other binder or binders. The binder or binders hitherto used for the magnetic recording medium may be used as these binders, such as, for instance, vinyl chloride-vinyl acetate copolymer, vinyl chloride-vinyl acetate-vinyl alcohol copolymer, vinyl chloride-vinyl acetate-maleinic acid copolymer, vinyl chloride-vinylidene chloride copolymer, vinyl chloride-acrylonitrile copolymer, acrylic acid ester-acrylonitrile copolymer, acrylic acid ester-vinylidene chloride copolymer, methacrylic acid ester-vinylidene chloride copolymer, methacrylic acid ester-styrene copolymer, thermoplastic polyurethane resin, phenoxy resin, polyvinyl fluoride, vinylidene chloride-acrylonitrile copolymer, butadiene-acrylonitrile copolymer, acrylonitrile-butadiene-methacrylic acid copolymer, polyvinyl butyral, cellulose derivatives, styrene-butadiene copolymer, polyester resin, phenolic resin, epoxy resin, thermohardening polyurethane resin, urea resin, melamine resin, alkyd resin, urea-formaldehyde resin or mixtures thereof. Above all, polyurethane or polyester resins or acrylonitrile-butadiene copolymer said to impart pliability to the coating layer are preferred. In addition, durability of the magnetic recording medium can be further improved by simultaneously using, for instance, trifunctional isocyanate compounds, or reaction products between 1 mol of trimethylol propane and 3 mols of tolylene diisocyanate as cross-linking agent. At any rate, upon polymerization of these binders, tertiary amine sulfonate or tertiary amine sulfuric ester, that is, polar groups, preferably has the polar group equivalent (or molecular weight per polar group) in the range of 1000 to 100,000. With the polar group equivalent in excess of 100,000, further results can hardly be expected. With the polar group equivalent less than 1000, no significant changes are caused in the results, but problems are presented in moisture-proofness of the magnetic recording medium.

In the magnetic recording medium of the present invention, the magnetic layer is formed by coating on the surface of the non-magnetic base material a magnetic paint prepared by dispersing the ferromagnetic powders in the aforementioned binder and dissolving them in an organic solvent.

It is noted that any materials usually employed for this kind of the magnetic recording medium can be used for the non-magnetic base material. These materials may be enumerated by polyesters such as polyethylene terephthalate, polyolefins such as polyethylene or propylene, cellulose derivatives such as cellulose triacetate, cellulose diacetate or cellulose acetate butylate, vinyl resin such as polyvinyl chloride or polyvinylidene chloride, plastics such as polycarbonate, polyimide, polyamide or polyamidimide, paper, metals such as aluminium or copper, lightweight alloys such as aluminium or titanium alloys, ceramics or monocrystal silicon. The non-magnetic base material may take the form of the film, tape, sheet, disc, card or drum, as desired.

Any of the ferromagnetic powders can be employed insofar as they are commonly used for the magnetic layer. Thus the ferromagnetic powders that can be used may include particles of ferromagnetic iron oxide, ferromagnetic chromium dioxide or ferromagnetic alloys, hexagonal barium-ferrite fine particles and iron nitride.

The aforementioned ferromagnetic iron oxide may be written by a general formula $FeO_x$ wherein $1.33 \leq x \leq 1.50$, that is, maghemite ($\gamma$-$Fe_2O_3$ with $x=1.50$), magnetite ($Fe_3O_4$ with $x=1.33$) and solid solutions thereof ($FeO_x$, with $1.33 < x < 1.50$). The ferromagnetic iron oxide may be admixed with cobalt for enhancing the coercive force. The cobalt-containing iron oxide may be classified roughly into the doped type and coated type.

As ferromagnetic chromium dioxide $CrO_2$ may be used by itself or as an admixture with at least one element selected from the group consisting of Rn, Sn, Te, Sb, Fe, Ti, V or Mn with a view to enhancing the coercive force.

As the powders of the ferromagnetic alloys, Fe, Co, Ni, Fe-Co, Fe-Ni, Fe-Co-Ni, Co-Ni, Fe-Co-B, Fe-Co-Cr-B, Mn-Bi, Mn-Al or Fe-Co-V may be used. Metallic components such as Al, Si, Ti, Cr, Mn, Cu or Zn may be added for improving various properties of the alloy powders.

The magnetic layer may contain, besides the aforementioned binder and the ferromagnetic powders, dispersants, lubricants, abrasives, antistatic or rustproofing agents as additives.

These ingredients of the magnetic layer are dissolved in an organic solvent to a magnetic paint which then is applied to the non-magnetic base material. The organic solvents for the magnetic layer may include ketones such as acetone, methylethylketone, methylisobutylketone or cyclohexanone, esters such as methyl acetate, ethyl acetate, butyl acetate, ethyl lactate or glycol acetate monoethyl ether, glycol ethers such as glycol dimethylether, glycol monoethyl ether or dioxane, aromatic hydrocarbons such as benzene, toluene or xylene, aliphatic hydrocarbons such as hexane or heptane, or chlorinated hydrocarbons such as methylene chloride, ethylene chloride, carbon tetrachloride, chloroform, ethylene chlorohydrin or dichlorobenzene.

It will be seen from the foregoing that the present invention provides a magnetic layer on the non-magnetic base material of the magnetic recording medium, wherein the binder employed in the magnetic layer is the vinyl chloride copolymer containing tertiary amine sulfonate or tertiary amine sulufuric ester as polar group in the molecule, such that it shows a high affinity to the magnetic powders while also showing excellent dispersibility even in instances wherein the magnetic powders are ultra-comminuted or exhibit a higher coercive force. Therefore, the resulting magnetic recording medium shows improved durability and surface characteristics while also showing superior electro-magnetic conversion characteristics.

The description with reference to a specific Example of the present invention and several Comparative Examples is given hereinbelow. It should be noted that these Examples are given only by way of illustration and are by no means intended for limiting the scope of the invention.

EXAMPLES AND COMPARATIVE EXAMPLES

The starting material containing the following ingredients was used:

| | |
|---|---|
| Ferromagnetic alloy powders (specific surface area: 40 m$^2$/g) | 100 wt. parts |
| Vinyl chloride-vinyl acetate copolymer | 10 wt. parts |
| Polyurethane resin (N-2304) | 10 wt. parts |
| Dimethyl Silicone Oil | 1 wt. part |
| Lecithin | 1 wt. part |
| Cr$_2$O$_3$ | 2 wt. parts |
| Methylethylketone | 100 wt. parts |
| Methylisobutylketone | 50 wt. parts |
| Toluene | 50 wt. parts |

The above composition was mixed for 48 hours in a ball mill and passed through a filter. To this mixture was added a hardener and the resulting mixture was further mixed for 30 minutes. The resulting product was applied to a polyethylene terephthalate film of 14 μm thickness so that the dry film thickness will be equal to 6 μm. The thus coated film was subjected to field orientation processing and dried to be then taken up on a drum. The resulting roll-like product was calendered and cut into sample tapes each being ½ inch in width.

In accordance with the above process, a sample tape was prepared with the use of different polar groups X introduced into the vinyl chloride-vinyl acetate copolymer as shown in the following Table (Examples 1 to 8).

Similarly, a sample tape was produced with the use of a vinyl chloride-vinyl acetate copolymer in which no polar groups are introduced (Comparative Example 1). A sample tape was also produced with the use of the vinyl chloride-vinyl acetate copolymer in which —SO$_3$Na and —OSO$_3$Na are introduced as polar groups (Comparative Examples 2 and 3).

With each produced sample tape, such properties as surface gloss, powder debris and still characteristics were measured.

It is noted that surface glass was measured with the use of a gloss meter and at angle of incidence of 75° and an angle of reflection at 75°. Powder debris was measured by a demerit mark system (−5 to 0) based on the results of the visual check of the amount of powder debris deposited on the head drum or guide after 100 times of repeated reciprocative running of the 60-minute tape. Still characteristics were measured in terms of the time elapsed until the playback output of the sample type with prerecorded 4.2 MHz video signals was decreased to 50% of the original value. The results are shown in the following Table.

It is seen from this Table that the respective sample tapes of the present invention are not only superior in surface gloss or powder debris but also markedly improved in still characteristics as compared to those in which —$SO_3Na$ or —$OSO_3Na$ have been introduced as polar groups.

TABLE

| | Amount of each monomer (mole %) | | | | Kind of polar group | Surface gloss (gloss) | Powder debris | Still characteristics (min.) |
|---|---|---|---|---|---|---|---|---|
| | ‒(CH$_2$CH)‒ Cl | ‒(CH$_2$CH)‒ OCOCH$_3$ | ‒(CH$_2$CH)‒ OH | ‒(CH$_2$CH)‒ X | | | | |
| Example 1 | 380 | 9 | 31 | 1 | —$OSO_3^\ominus HN^\oplus$-C$_5$H$_5$ (pyridinium) | 82 | −1.0 | 820 |
| Example 2 | 380 | 9 | 27 | 5 | —$OSO_3^\ominus HN^\oplus$-C$_5$H$_5$ | 93 | −0.5 | 1200 |
| Example 3 | 380 | 9 | 22 | 10 | —$OSO_3^\ominus HN^\oplus$-C$_5$H$_5$ | 93 | −0.5 | 950 |
| Example 4 | 380 | 9 | 27 | 5 | —$OSO_3^\ominus HN^\oplus(CH_3)_3$ | 95 | −0.75 | 1030 |
| Example 5 | 380 | 9 | 27 | 5 | —$OSO_3^\ominus HN^\oplus(C_2H_5)_3$ | 93 | −1.0 | 910 |
| Example 6 | 380 | 9 | 27 | 5 | —$OSO_3^\ominus HN^\oplus(CH_3)_2 C_6H_{13}$ | 87 | −1.5 | 800 |
| Example 7 | 380 | 9 | 27 | 5 | —$SO_3^\ominus HN^\oplus$-C$_5$H$_5$ | 94 | −0.5 | 1080 |
| Example 8 | 380 | 9 | 27 | 5 | —C$_6$H$_4$—$SO_3^\ominus HN^\oplus$-C$_5$H$_5$ | 90 | −1.0 | 850 |
| Comparative Example 1 | 380 | 9 | 32 | 0 | — | 75 | −3.0 | 450 |
| Comparative Example 2 | 380 | 9 | 27 | 5 | —$OSO_3^\ominus Na^\oplus$ | 86 | −0.75 | 780 |
| Comparative Example 3 | 380 | 9 | 27 | 5 | —$SO_3^\ominus Na^\oplus$ | 85 | −1.0 | 610 |

What is claimed is:

1. A magnetic recording medium comprising a nonmagnetic substrate and a magnetic layer formed thereon composed mainly of magnetic powder and a binder, said binder containing a compound represented by a following formula:

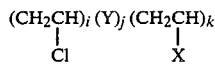

wherein X represents tertiary amine sulfonate or tertiary amine sulfuric ester, Y represents a monomer having vinyl group which is copolymerizable with vinyl chloride and i, j, k represent polymerization degrees, i being in the range from 100 to 1000 and k being in the range from 0.1 to 100; and x having a polar group equivalent in the range from 1000 to 100,000.

2. A magnetic recording medium according to claim 1, wherein X represents a tertiary amine sulfuric ester of formula:

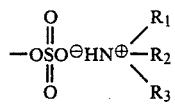

wherein $R_1$, $R_2$ and $R_3$ represent monovalent hydrocarbon groups with 1 to 6 carbon atoms.

3. A magnetic recording medium according to claim 1, wherein X represents a tertiary amine sulfuric ester of formula:

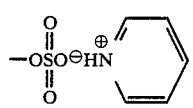

4. A magnetic recording medium according to claim 1, wherein X represents a tertiary amine sulfonate of formula:

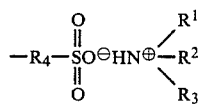

wherein $R_1$, $R_2$ and $R_3$ represent monovalent hydrocarbon groups with 1 to 6 carbon atoms and $R_4$ represents a divalent organic group selected from the group consisting of —CH$_2$—, —OCH$_2$CH$_2$CH$_2$—,

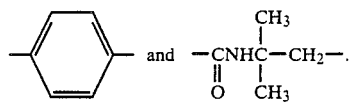

5. A magnetic recording medium according to claim 1, wherein X represents a tertiary amine sulfonate of formula:

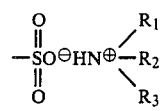

wherein $R_1$, $R_2$ and $R_3$ represent monovalent hydrocarbon groups with 1 to 6 carbon atoms.

6. A magnetic recording medium according to claim 1, wherein X represents a tertiary amine sulfonate of formula:

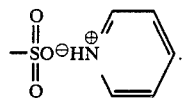

7. A magnetic recording medium according to claim 1, wherein X represents a tertiary amine sulfonate of formula:

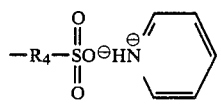

wherein $R_4$ represents a divalent organic group selected from the group consisting of —CH$_2$—, —OCH$_2$CH$_2$CH$_2$—,

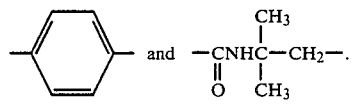

8. A magnetic recording medium according to claim 1, wherein Y represents a monomer or monomers selected from the group consisting of vinyl acetate, vinyl alcohol, maleic acid, maleic anhydride, acrylic acid, acrylic ester, methacrylic acid, methacrylic ester, acrylonitrile, vinylidene chloride and vinyl propionate.

* * * * *